Figure 1:
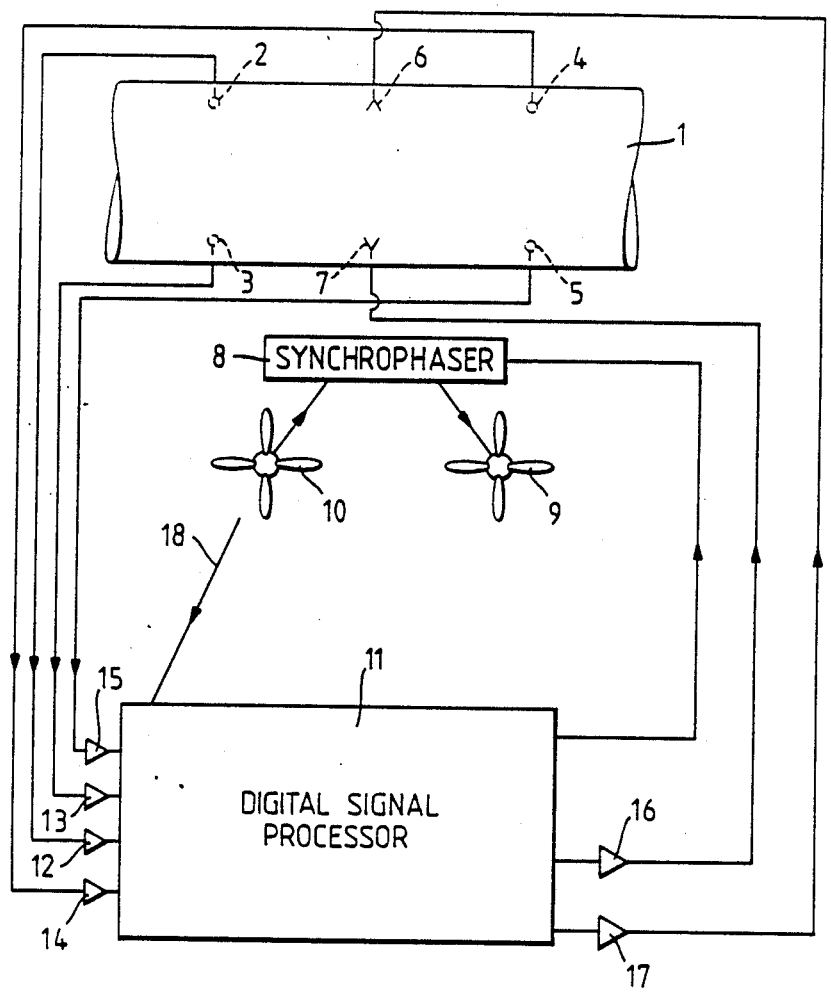

United States Patent [19]

Elliott et al.

[11] Patent Number: 4,947,356

[45] Date of Patent: Aug. 7, 1990

[54] AIRCRAFT CABIN NOISE CONTROL APPARATUS

[75] Inventors: Stephen J. Elliott, Winchester; Philip A. Nelson, Southampton, both of England

[73] Assignee: The Secretary of State for Trade and Industry, London, England

[21] Appl. No.: 312,709

[22] PCT Filed: Jun. 23, 1987

[86] PCT No.: PCT/GB87/00442

§ 371 Date: Feb. 10, 1989

§ 102(e) Date: Feb. 10, 1989

[87] PCT Pub. No.: WO87/07974

PCT Pub. Date: Dec. 30, 1987

[30] Foreign Application Priority Data

Jun. 23, 1986 [GB] United Kingdom ............... 8615315

[51] Int. Cl.$^5$ ...................... H04R 27/00; B64C 11/50
[52] U.S. Cl. ............................ 364/574; 364/424.01; 384/71; 244/1 N
[58] Field of Search ................. 364/266, 166, 574; 381/71; 416/34; 244/1 N

[56] References Cited

U.S. PATENT DOCUMENTS

| | | | |
|---|---|---|---|
| 3,689,175 | 9/1972 | Hartzell et al. | 416/34 |
| 4,025,724 | 5/1977 | Davidson, Jr. et al. | 364/574 |
| 4,245,955 | 1/1981 | Lambertson | 416/34 |
| 4,566,118 | 1/1986 | Chaplin et al. | 381/71 |
| 4,589,133 | 5/1986 | Swinbanks | 381/71 |
| 4,659,283 | 4/1987 | Niessen et al. | 416/35 |
| 4,689,821 | 8/1987 | Salikuddin et al. | 381/61 |
| 4,715,559 | 12/1987 | Fuller | 381/71 |

FOREIGN PATENT DOCUMENTS 2126837A 8/1983 United Kingdom .
2149614A 10/1984 United Kingdom .

OTHER PUBLICATIONS

Journal of Aircraft, vol. 23, No. 2, "Propeller Model for Studying Trace Velocity Effects on Interior Noise".
Automotive Engineering, vol. 89, No. 10, Oct. 1981, Society of Automotive Engineers, Inc. (N.Y., U.S.), F. B. Metzger, pp. 107-113, International Search Report.

*Primary Examiner*—Parshotam S. Lall
*Assistant Examiner*—Michael Zanelli
*Attorney, Agent, or Firm*—Nixon & Vanderhye

[57] ABSTRACT

In propeller of fan driven aircraft, cabin noise levels may be reduced by adjustment of the phase relationship between a reference propeller or fan and some or all of the other propellers or fans. An aircraft cabin (1) contains four microphones and two loudspeakers which form the active elements of a noise control system. The microphone outputs are fed via amplifiers to a digital signal processor (11) having an adaptation algorithm in a memory store. The processor generates an error signal which is used to adjust the synchrophase angle between the reference propeller and a synchrophased propeller, controlled by a synchrophaser. Thus the synchrophase angle is varied dynamically during flight to minimize propeller noise in the cabin over a range of flying conditions.

8 Claims, 4 Drawing Sheets

AIRCRAFT CABIN NOISE CONTROL APPARATUS

The present invention relates to apparatus for controlling cabin noise in propeller or fan driven aircraft.

Several proposals for reducing noise are reviewed in an article entitled 'Strategies for reducing propeller aircraft cabin noise' by F B Metzger in Automotive Engineering, 1981, Vol 2, No. 1, Page 5. In particular, the use of synchrophasing to reduce noise levels in multi-engine transport aircraft is reviewed. Synchrophasing is the automatic control of one or more propellers to provide a fixed phase relationship between the circumferential blade locations of the propellers in relation to a reference propeller. By maintaining an accurate phase relationship between the propellers the annoying beat characteristic of unsynchronsied propellers is avoided. Cabin noise levels may be reduced by careful adjustment of this phase relationship.

There have been a number of proposals for large unducted fan aircraft engines for operation at cruising speeds of between 0.6M and 0.8M. Such engines are mounted at the rear of an aircraft fuselage and a number of proposed designs include contra-rotating forward and rearward fans. The rearward fan reduces residual swirl from the forward fan and improves the overall efficiency of the engine. Cabin noise arising from the use of such engines is likely to be a major problem.

The present invention provides an improved form of aircraft cabin noise control using synchrophasing and active noise control techniques.

According to the present invention, cabin noise control apparatus for a propeller or fan driven aircraft includes means for varying, during flight, the phase relationship between a reference propeller or fan of the aircraft and one, some or all of the other propellers or fans of the aircraft characterised in that the phase relationship is varied in response to the output from a signal processor connected to receive and analyse signals from a plurality of transducers located inside the cabin.

The transducers may be microphones in which case the signal processor may form part of an active noise control system which generates sound waves in antiphase with ambient noise waves. Such a system may, for example, be as claimed in UK Pat. No. 2149614. This system provides apparatus for reducing noise in an enclosed space where the noise, generated by an external source, has a fundamental frequency $f_O$ and a series of harmonics thereof. The value of $f_O$ is monitored and communicated to a signal processor and the sound pressure level in the enclosure is monitored by a plurality of microphones and also communicated to the processor. The processor outputs signals to a plurality of loudspeakers, these signals being in antiphase with the input signals so as to minimise the sound pressure level in the enclosure.

Alternatively, the transducers may be mounted, for example, on a vibrating part of the aircraft which radiates sound into the cabin. The signal processor linked to such accelerometers may also form part of an active noise control system similar to that just described. Microphones and accelerometers may also be used in this way in combination with one another.

In an aircraft having multishaft engines, the phase varying means may be arranged to vary the phase relationship between the reference propeller or fan on one shaft and a propeller or fan on the other shaft of the same engine.

Figure 2:
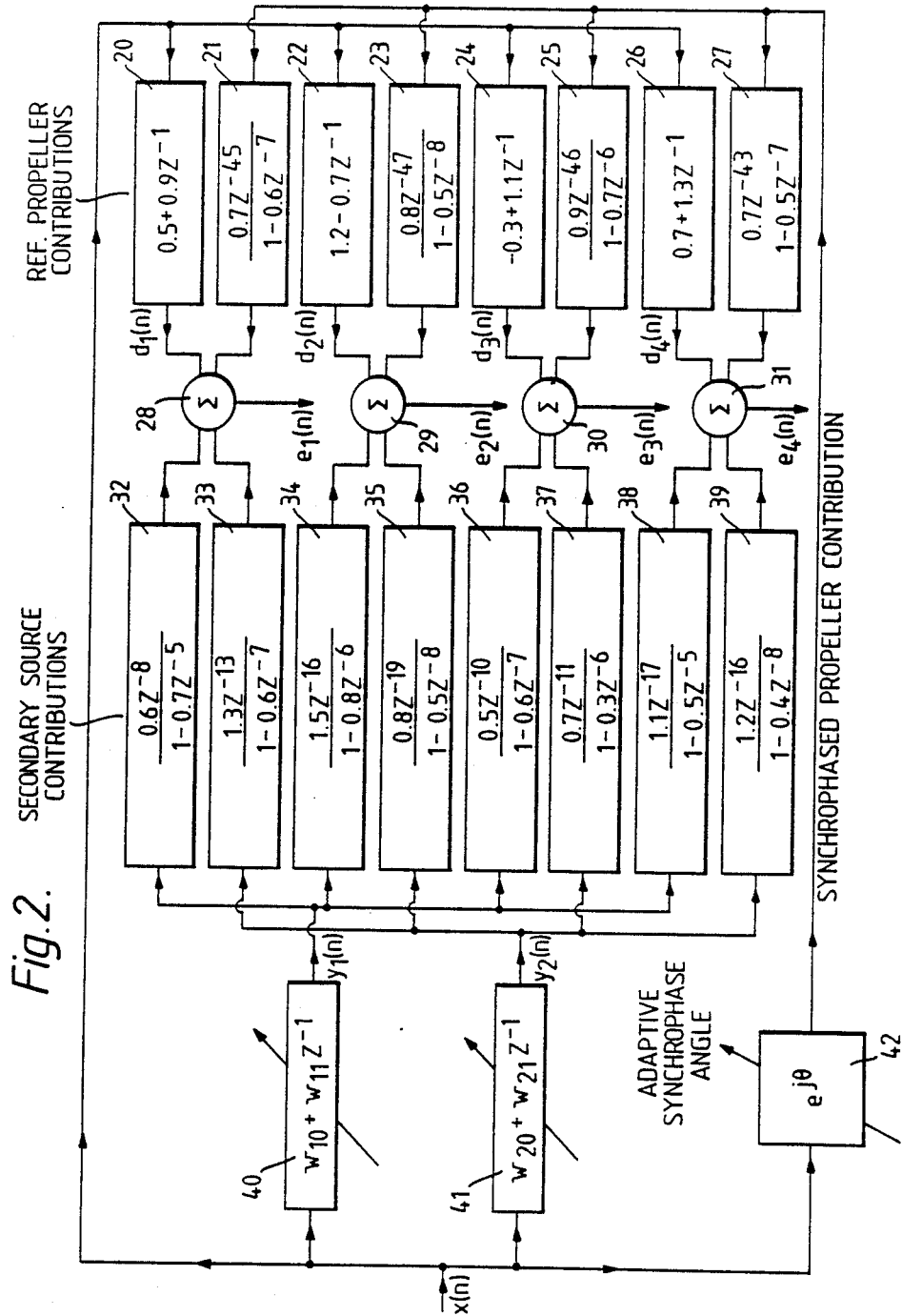
Figure 3:
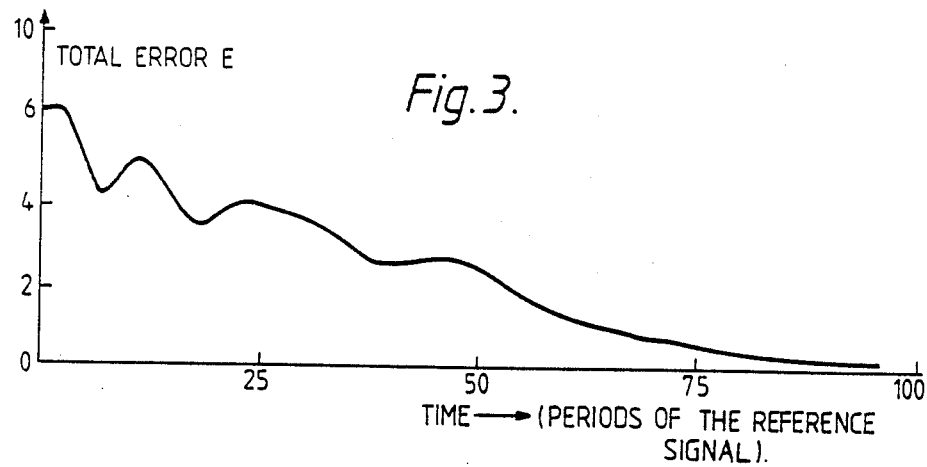
Figure 6:
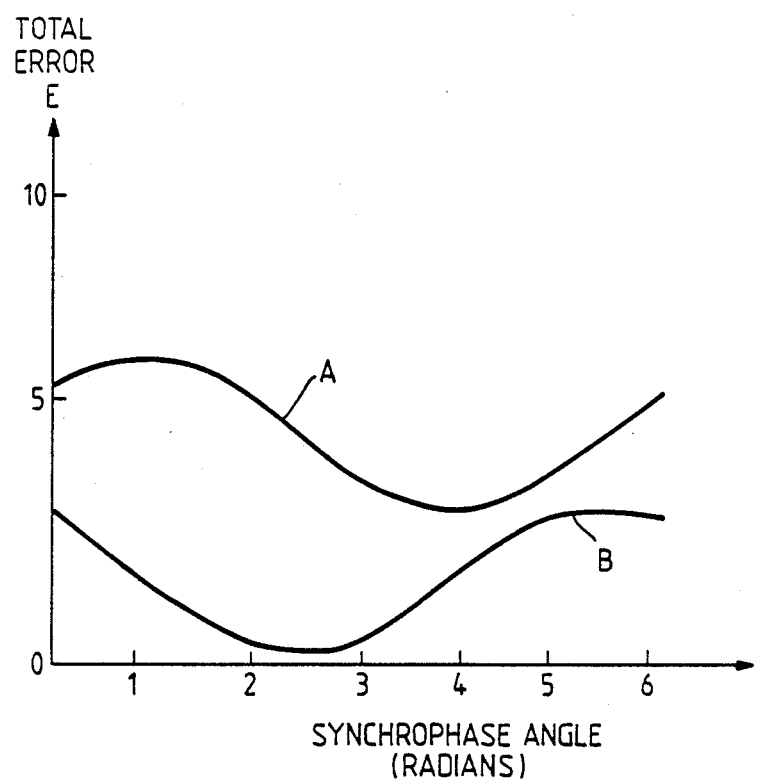

An embodiment of the invention will now be described with reference to the drawings of which:

FIG. 1 is a schematic diagram of aircraft cabin noise control apparatus in accordance with the invention, FIG. 2 is a block diagram of a computer simulation of the apparatus of FIG. 1, FIGS. 3, 4 and 5 are graphs showing the results of the simulation of FIG. 2, FIG. 6 is a graph showing error functions for systems with and without active noise control.

In FIG. 1, an aircraft cabin 1 (only part of which is shown) contains four microphones 2, 3, 4, 5 and two loudspeakers 6, 7 which form the active elements of a cabin noise control system. Outputs from the microphones 2, 3, 4, 5 are fed via amplifiers 12, 13, 14, 15 respectively to the input of a digital signal processor, 11. A reference signal 18 at the fundamental frequency $f_O$ is fed into the processor 11 via a tachometer (not shown). The processor 11 has an adaptation algorithm in a memory store (not shown). The adaptation algorithm is described in UK Pat. No. 2149614 and operates to minimise the sum of the squares of the microphone outputs. The same error function as is used in the processor of the above patent is used to adjust the synchrophase angle between a reference propeller 10 and a synchrophased propeller 9 controlled by a synchrophaser 8 having a control input from the signal processor 11. Thus the synchrophase angle is varied dynamically during flight to minimise propeller noise in the cabin over a range of flying conditions. The following algorithm may be used to adjust the synchrophase angle to minimise cabin noise:

The sampled output from the lth error sensor, $e_l(n)$, is a linear combination of the output due to a reference propeller $d_l(n)$ and outputs from a further M slave propellers whose synchrophase angle, $\theta_m$, is controlled. The sampled outputs due to the M slave propellers are considered as a convolution of an effective source strength $S_m(n)$ where $$S_m(n) = A \cos(\omega_o n + \theta_m)$$

where
A = an arbitrary reference amplitude
$\omega_o = 2\pi \times$ blade passage frequency $\times$ sample time and
n = the sample number
with an effective filter having coefficients $C_{lmj}$ so that $$e_l(n) = d_l(n) + \sum_{m=1}^{M} \sum_{j=o}^{J-1} C_{lmj} S_m(n-j)$$

The total error, E, is defined as:

$$E = \sum_{l=1}^{L} \overline{e_l^2}$$

So that the rate of change of E with respect to one synchrophase angle is:

$$\frac{\partial E}{\partial \theta_m} = 2 \sum_{l=1}^{L} \overline{e_l(n) \frac{\partial e_l(n)}{\partial \theta_m}}$$

Now

-continued $$\frac{\partial e_l(n)}{\partial \theta_m} = -\sum_{j=0}^{J-1} C_{lmj}A\sin(\omega_0(n-j) + \theta_m)$$

$$= \sum_{j=0}^{J-1} C_{lmj}A\cos\left(\omega_0(n-j) + \theta_m - \frac{\pi}{2}\right)$$

Let $k = \frac{\pi}{2\omega_0}$, so that $$\frac{\partial e_l(n)}{\partial \theta_m} = \sum_{j=0}^{J-1} C_{lmj}S_m(n-j-k) = r_{lm}(n), \text{ say}$$

which is computed from a knowledge of $S_m(n)$ and the previously measured filter coefficients.

Thus $$\frac{\partial E}{\partial \theta_m} = 2 \sum_{l=1}^{L} \overline{e_l(n)r_{lm}(n)}$$

and adjusting the synchrophase angle(s) with an instantaneous estimate of this gradient every sample gives $$\theta_m(n+1) = \theta_m(n) - \alpha \sum_{l=1}^{L} e_l(n)r_{lm}(n)$$

where $\alpha$ is a convergence coefficient.

Figure 4:
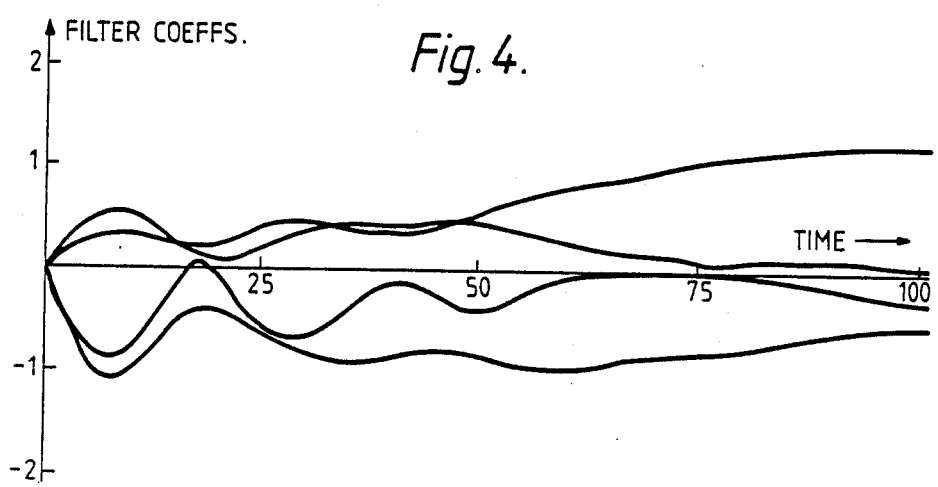
Figure 5:
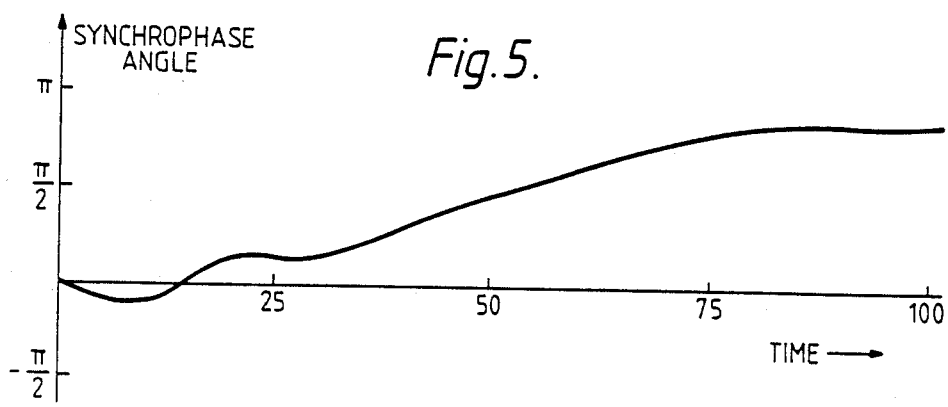

A block diagram of a computer simulation of the apparatus is shown in FIG. 2. The simulation assumes four microphones and two loudspeakers together with inputs from a reference propeller and a synchrophased propeller. A reference signal x(n) of the form cos $$\left(\frac{n\pi}{2}\right)$$

is filtered by filters 40 and 41 which are adaptively adjusted by the digital signal processor 11 to generate secondary source contributions $y_1(n)$ and $y_2(n)$, from the two loudspeakers. Filters 32–39 are employed as delays and integrators which model the cabin acoustics. The reference and synchrophased propeller contributions are similarly filtered by filters 20–27. The filter 42 represents the action of the synchrophaser and introduces a phase change in the input from one propeller which is determined adaptively by the action of the digital signal processor 11. Error terms are subsequently computed by means of summers 28–31. The actual convergence behaviour of the computer simulation may not be exactly the same as that in a real aircraft because of the uncertainties in estimating the time delays in changing synchrophase angles. The results of the simulation (see FIGS. 3, 4 and 5) show that an active noise control system coupled with synchrophased propellers can be stable. As can be seen from FIG. 3, the total error, which is the sum of the squares of the outputs from the four microphones, converges to a minimum whilst a steady synchrophase angle of between $\pi/2$ and $\pi$ is reached (see FIG. 5). FIG. 4 shows the corresponding variation of the filter coefficients driving the two secondary sources during the same simulation run as for FIGS. 3 and 5.

The afore-mentioned simulation uses an error function comprising the sum of the squares of the microphone outputs at the fundamental blade passage frequency. However, an error function comprising the sum of the squares of the microphone outputs at a harmonic of this frequency, or combinations of harmonics, may be used alternatively. Those skilled in the art will realise that the above algorithm can be readily modified accordingly. To ensure that the total error converges to the lowest minimum value possible, a test can be performed by determining its value under a first synchrophase angle condition and then under a second synchrophase angle, $\pi$ radians removed from the first. The synchrophase angle condition which gives the lowest total error can be used as a starting point for a new convergence procedure.

For active noise control apparatus comprising a large number of microphones and secondary sound sources, the computational load may be great. This load may be reduced by using the following modified algorithm:

$$\theta_m(kN+1) = \theta_m(kN) - \alpha^1 \left[\sum_{l=1}^{L} e_l(kN)r_{lm}(kN) + \sum_{l=1}^{L} e_l(kN-1)r_{lm}(kN-1)\right]$$

where $\alpha^1$ is a convergence coefficient, k is an integer and $\theta_m$ is updated once every N samples. A similar modification can be applied to the adaptation algorithm as described in UK Pat. No. 2149614 for updating the filter coefficients.

It will be appreciated that the processor 11 will still give a valid output to the synchrophaser 8 even when the secondary source contributions are reduced to zero. The variation of total error, E, with synchrophase angle for such a system, A, is shown in FIG. 6, together with the corresponding variation of E for a system B, wherein the synchrophaser and loudspeakers are allowed to operate simultaneously. It can be seen that the minimum value of E for system B occurs at a different synchrophase angle to that of system A. Furthermore, system B produces a lower value of E for all synchrophase angles from 0 to $2\pi$ radians.

We claim:

1. Cabin noise control apparatus for an at least two propeller or fan driven aircraft, said apparatus comprising:
   a plurality of transducers located inside a cabin of said aircraft;
   a signal processor means for receiving and analyzing signals from said plurality of transducers wherein said signal processor means computes an estimate of the gradient of the sum of the means square outputs of the transducers with respect to the phase relationship $\theta m$ between a reference propeller or fan and each other propeller or fan and causes the synchrophaser to increment $\theta m$ by an amount dependent on the value of the gradient in order to minimise the sum of the mean square outputs of the transducers; and
   a synchrophaser for varying, during flight, the phase relationship between a reference propeller or fan of the aircraft and at least one of the other propellers or fans of the aircraft in response to the output from said signal processor.

2. Cabin noise control apparatus as claimed in claim 1 wherein at least one of the transducers is a microphone.

3. Cabin noise control apparatus as claimed in claim 1 wherein at least one of the transducers is an accelerometer.

4. Cabin noise control apparatus as claimed in claim 1 characterised in that the signal processor forms part of an active noise control system which generates sound waves in anti-phase with ambient noise waves.

5. Cabin noise control apparatus for an at least two propeller or fan driven aircraft, said apparatus comprising:
   a plurality of transducers located inside a cabin of said aircraft;
   a signal processor means for receiving and analyzing signals from said plurality of transducers and for computing an estimate of a gradient of a sum of a mean square output of said transducers with respect to a phase relationship $\theta m$ between at least one reference propeller or fan and at least one other propeller or fan; and
   a synchrophaser for varying, during flight, the phase relationship between said reference propeller or fan and said at least one other propeller or fan and in response to said signal processor means, incrementing $\theta m$ an amount dependent upon the value of said gradient in order to minimize the sum of the mean square outputs of said transducers.

6. Cabin noise control apparatus as claimed in claim 5 wherein at least one of said transducers is a microphone.

7. Cabin noise control apparatus as claimed in claim 5 wherein at least one of said transducers is an accelerometer.

8. Cabin noise apparatus as claimed in claim 5 in which said signal processor comprises at least a portion of an active noise control system which generates sound waves in anti-phase with ambinent noise waves.

* * * * *